United States Patent
Watanabe

(10) Patent No.: US 8,494,064 B2
(45) Date of Patent: Jul. 23, 2013

(54) WIRELESS COMMUNICATION APPARATUS AND WIRELESS COMMUNICATION METHOD

(75) Inventor: Kazunari Watanabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1107 days.

(21) Appl. No.: 12/041,954

(22) Filed: Mar. 4, 2008

(65) Prior Publication Data

US 2008/0219368 A1 Sep. 11, 2008

(30) Foreign Application Priority Data

Mar. 7, 2007 (JP) ................................. 2007-057241

(51) Int. Cl.
*H04K 1/10* (2006.01)
*H04L 5/12* (2006.01)
*H04R 29/00* (2006.01)

(52) U.S. Cl.
USPC .............................. 375/260; 375/261; 381/56

(58) Field of Classification Search
USPC ..................................... 375/260, 261; 381/56
See application file for complete search history.

(56) References Cited

U.S. PATENT DOCUMENTS

| | | | | |
|---|---|---|---|---|
| 4,454,539 A * | 6/1984 | Fedde et al. | .................. | 348/126 |
| 4,675,880 A * | 6/1987 | Davarian | ...................... | 375/261 |
| 5,353,172 A * | 10/1994 | Alioth | ............................. | 360/70 |
| 5,585,974 A * | 12/1996 | Shrinkle | ......................... | 360/46 |
| 5,700,961 A * | 12/1997 | Anthony et al. | ................ | 73/866 |
| 5,952,587 A * | 9/1999 | Rhodes et al. | ........... | 73/862.541 |
| 7,545,867 B1 * | 6/2009 | Lou et al. | ...................... | 375/259 |
| 2003/0224750 A1 * | 12/2003 | Sampath | ..................... | 455/276.1 |
| 2005/0094741 A1 * | 5/2005 | Kuroda | .......................... | 375/267 |
| 2005/0095996 A1 * | 5/2005 | Takano | ............................ | 455/91 |
| 2005/0118958 A1 * | 6/2005 | Alexiou | ...................... | 455/67.11 |
| 2005/0185728 A1 * | 8/2005 | Wallace et al. | ............... | 375/267 |
| 2006/0251180 A1 * | 11/2006 | Baum et al. | ................... | 375/260 |
| 2006/0262938 A1 * | 11/2006 | Gauger et al. | ................. | 381/56 |
| 2006/0275541 A1 * | 12/2006 | Weimer | ....................... | 427/96.1 |

FOREIGN PATENT DOCUMENTS

| | | |
|---|---|---|
| JP | 7-23464 A | 1/1995 |
| JP | 2003-92549 A | 3/2003 |
| JP | 2005-142715 | 6/2005 |
| JP | 2005-160030 | 6/2005 |
| JP | 2006-033658 | 2/2006 |
| JP | 2006-279903 A | 10/2006 |
| JP | 2006-279905 A | 10/2006 |
| WO | 2005/064871 A1 | 7/2005 |

OTHER PUBLICATIONS

Japanese Office Action dated Oct. 18, 2011 issued in corresponding Japanese Patent Application No. 2007-057241.
Japanese Office Action dated Jul. 24, 2012 issued in corresponding Japanese Patent Application No. 2007-057241.

\* cited by examiner

*Primary Examiner* — Leon-Viet Nguyen
*Assistant Examiner* — Sarah Hassan
(74) *Attorney, Agent, or Firm* — Fitzpatrick, Cella, Harper & Scinto

(57) ABSTRACT

When performing data communication with a second wireless communication apparatus having a plurality of antennas by using a plurality of transmission channels formed by spatial multiplexing, a first wireless communication apparatus having a plurality of antennas determines whether the second wireless communication apparatus is capable of communication using the plurality of transmission channels, and, on the basis of the determination result, executes a calibration process of forming the plurality of transmission channels with respect to the second wireless communication apparatus.

13 Claims, 8 Drawing Sheets

WIRELESS COMMUNICATION APPARATUS AND WIRELESS COMMUNICATION METHOD

BACKGROUND OF THE INVENTION

1. Field of the Invention

The present invention relates to a wireless communication apparatus and wireless communication method.

2. Description of the Related Art

The speed of a wireless LAN method standardized as IEEE802.11 has increased with the advent of, e.g., IEEE802.11b and IEEE802.11g. Presently, IEEE802.11n exceeding 100 Mbps is being standardized.

In IEEE802.11n, the use of the MIMO (Multi-Input Multi-Output) transmission method is being examined as a means for achieving large-capacity data transmission.

This MIMO transmission method is the technique by which both the transmitting side and receiving side comprise a plurality of antenna elements, and form a plurality of logical spatial streams (unique paths) by space-division multiplexing, thereby increasing the transmission capacity and communication rate.

Various methods can configure MIMO transmission. One known method is the SVD-MIMO method that uses SVD (Singular Value Decomposition) of a transfer function.

FIG. 3 is a view showing the concept of the SVD-MIMO transmission method.

Reference numeral 301 denotes transmission channels when the number of transmitting-side antennas is M and the number of receiving-side antennas is N. In this case, the channel characteristics are represented by an N×M numerical value matrix (to be referred to as a channel response matrix hereinafter). An element $a_{nm}$ of this channel response matrix is a transfer function from the mth transmitting antenna to the nth receiving antenna.

Reference numeral 302 expresses an equivalent circuit obtained by performing SVD on the channel response matrix 301. $E_t^H$ indicates the eigenvector of the transmitting-side antennas, $E_r$ indicates the eigenvector of the receiving-side antennas, and $$\sqrt{\lambda_1} \sqrt{\lambda_2} \ldots \sqrt{\lambda_{M_0}}$$ ($M_0$; the value of a smaller one of N and M)

indicates virtual transmission channels (unique paths or spatial streams). By respectively presetting the eigenvectors $E_t^H$ and $E_r$ on the transmitting side and receiving side, $M_0$ signals can be transmitted with no interference from the transmitting side to the receiving side. Note that the amplitude gain of the unique path is $$\sqrt{\lambda_i}$$

The transmission capacity changes in accordance with the size of the unique path.

To perform wireless transmission using the SVD-MIMO transmission method, the eigenvectors $E_t^H$ and $E_r$ must be respectively preset on the transmitting side and receiving side.

To obtain the eigenvectors $E_t^H$ and $E_r$ on the transmitting side and receiving side, the transmitting side and receiving side must execute a calibration process before communication. Various methods and procedures of the calibration process have been proposed (US2005-094741 (corresponding to Japanese Patent Laid-Open No. 2005-142715), US2005-095996 (corresponding to Japanese Patent Laid-Open No. 2005-160030), and Japanese Patent Laid-Open No. 2006-33658).

The above patent references describe the procedures and methods of the calibration process itself, but none of them refers to the execution timing of the calibration process.

SUMMARY OF THE INVENTION

It is an object of the present invention to execute a calibration process of forming a plurality of transmission channels at a proper timing when communicating data by using the transmission channels formed by spatial multiplexing between wireless communication apparatuses each having a plurality of antennas.

Other objects and features of the present invention will become apparent from the following specification and drawings.

According to one aspect of the present invention, there is provided a wireless communication method in which a first wireless communication apparatus having a plurality of antennas performs data communication with a second wireless communication apparatus having a plurality of antennas by using a plurality of transmission channels formed by spatial multiplexing, the method comprising the steps of: determining whether the second wireless communication apparatus is capable of data communication using the plurality of transmission channels; and executing a calibration process of forming the plurality of transmission channels with respect to the second wireless communication apparatus, on the basis of the determination result in the determining step.

According to another aspect of the present invention, there is provided a first wireless communication apparatus which performs data communication with a second wireless communication apparatus having a plurality of antennas by using a plurality of transmission channels formed by spatial multiplexing, the first wireless communication apparatus comprising: a determination unit which determines whether the second wireless communication apparatus is capable of data communication using the plurality of transmission channels; and a calibration unit which executes a calibration process of forming the plurality of transmission channels with respect to the second wireless communication apparatus, on the basis of the determination result obtained by the determination unit.

Further features of the present invention will become apparent from the following description of exemplary embodiments (with reference to the attached drawings).

DESCRIPTION OF THE EMBODIMENTS

Embodiments according to the present invention will be explained below with reference to the accompanying drawings.

Figure 1:
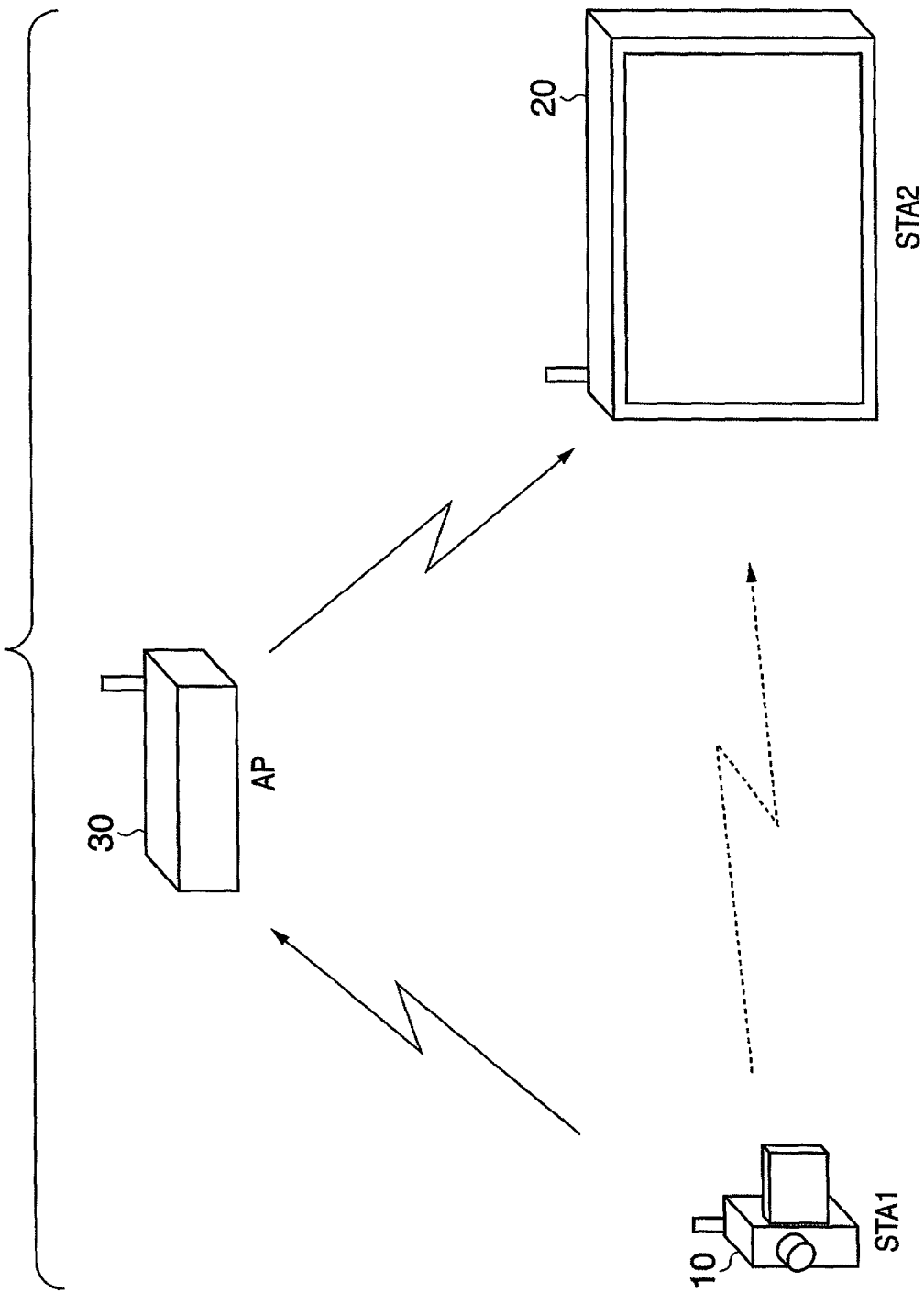
FIG. 1 shows a wireless communication system according to an embodiment.

FIG. 1 is a view showing a representative arrangement of a wireless communication system according to an embodiment. This wireless communication system comprises wireless terminals (STAs; stations) and a base station (AP; access point).

The AP is a controller that controls communication of the STA, and manages the STAs existing in its wireless service area. The AP can relay wireless communication between the STAs, and directly communicate with the STA.

The STA is an apparatus that performs wireless communication with another STA under the control of the AP.

Assume that each STA and the AP have a wireless LAN function corresponding to the IEEE802.11 standard and the IEEE802.11e and IEEE802.11n standards as extended versions of the IEEE802.11 standard.

Also, IEEE802.11n can perform wireless communication using the MIMO transmission method. As described previously, the MIMO transmission method is the technique by which both the transmitting side and receiving side comprise a plurality of antenna elements, and form a plurality of logical spatial streams (unique paths) by space-division multiplexing, thereby increasing the transmission capacity and communication rate.

Reference numeral 10 denotes a digital video camera (to be referred to as an STA1 hereinafter) having a video data transmitting function. The STA1 can also switch to the function of the AP. Reference numeral 20 denotes a television monitor (to be referred to as an STA2 hereinafter) having a video data receiving function. Reference numeral 30 denotes the AP. The AP 30 can form a network (BSS; Basic Service Set) by establishing logical connections (associations) with the STA1 and STA2.

Figure 2:
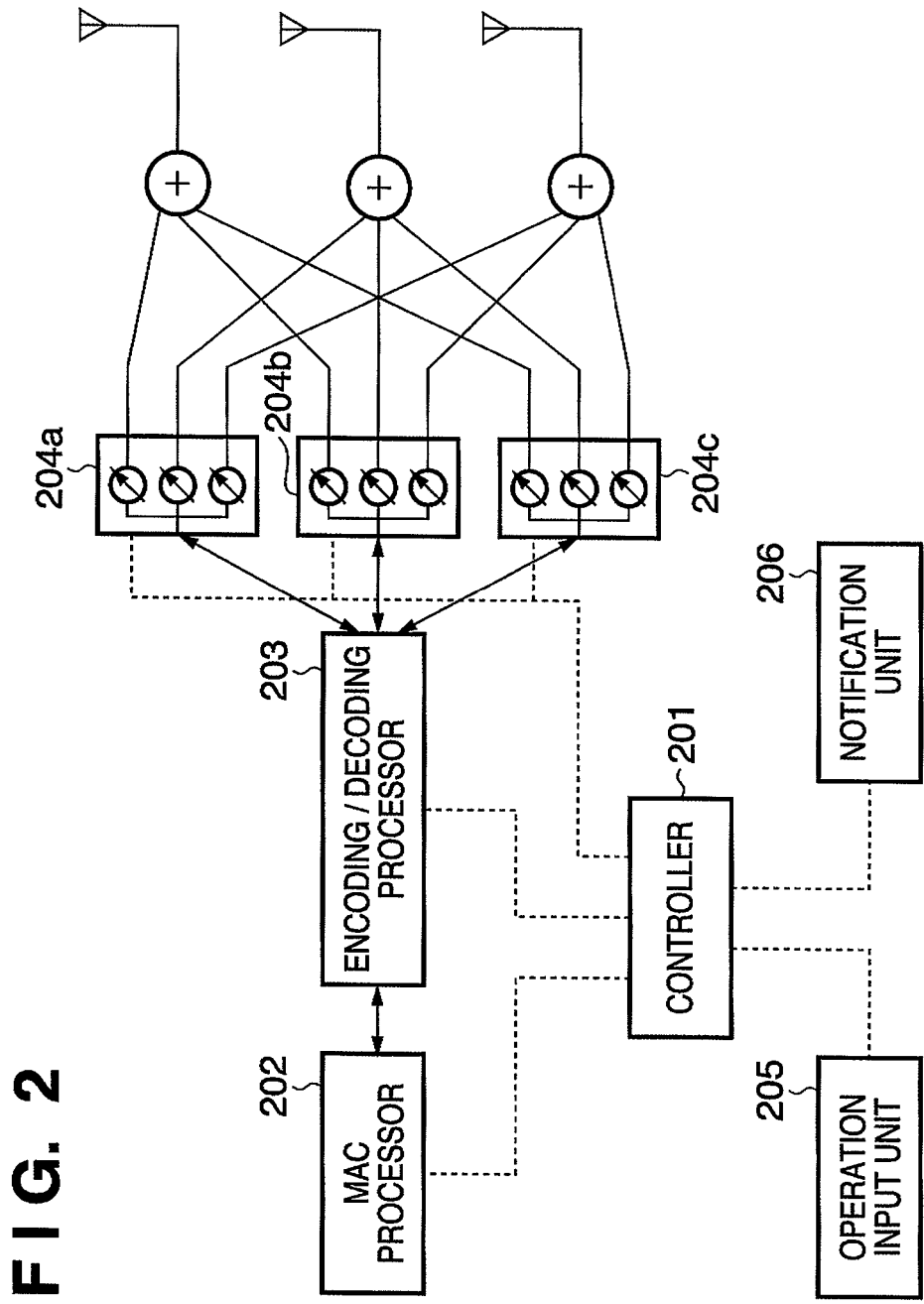
FIG. 2 is a block diagram showing each of an STA1, STA2, and AP.
Figure 3:
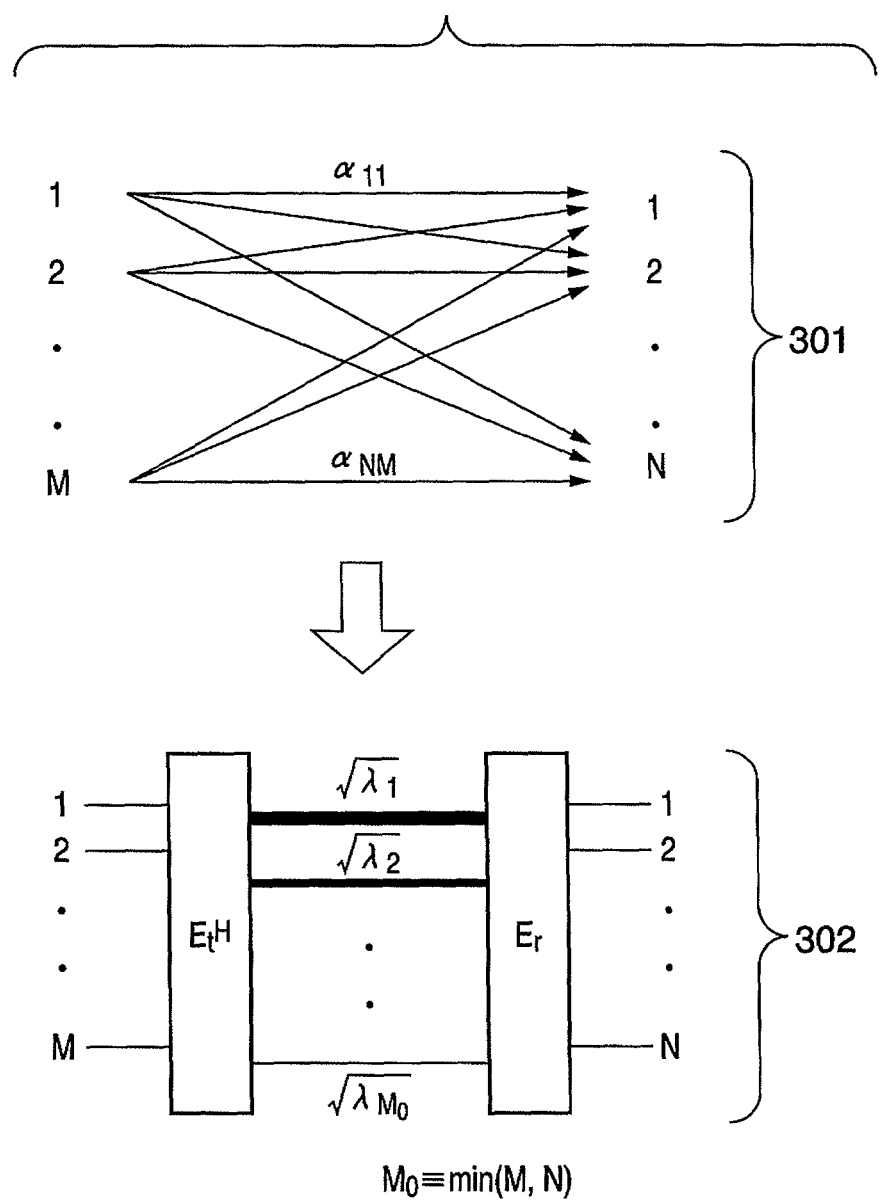
FIG. 3 is a view showing the concept of the SVD-MIMO transmission method.

FIG. 2 is a view showing the block configuration of each of the STA1, STA2, and AP.

A controller 201 controls the overall operation such as a calibration process of the apparatus. Assume that the method described in patent reference 1 is used as a practical method of the calibration process. The method of the calibration process will be briefly explained below.

First, one apparatus (e.g., the receiving side) transmits reference signals equal in number to receiving antennas to the other apparatus (e.g., the transmitting side). The transmitting apparatus acquires a channel response matrix by receiving the reference signals, and determines an eigenvector $E_t^H$ on the basis of the acquired channel response matrix. Then, the transmitting apparatus calculates the weight of each signal to be multiplexed, and transmits the weighted training signal to the receiving apparatus. The receiving apparatus having received the training signal determines an eigenvector $E_r$ on the basis of the training signal.

Note that the above explanation is made by assuming that the transmitting apparatus and receiving apparatus are predetermined for the sake of convenience. However, the data transmitting and receiving directions are not limited. In each embodiment to be described later, an apparatus having decided to start the execution of the calibration process transmits the reference signals to the partner apparatus, thereby starting the calibration process. Note also that a practical method of the calibration process is not limited to the above method, and another method may also be used.

The controller 201 also stores the result of the calibration process as log information in a storage unit (not shown). The process result is stored in association with the MAC address or network identifier (SSID; Service Set Identifier) of the communication partner for which the calibration process has been executed.

In addition, the controller 201 has a timer function. The controller 201 can freely set the value of the timer, and can start, stop, or reset the timer at an arbitrary timing.

The controller 201 also has a counter for performing counting whenever receiving a transmission error rate notified by a MAC processor 202. The controller 201 can set or reset the counter at a predetermined timing.

The controller 201 can also instruct the MAC processor 202 to activate DLS (Direct Link Setup) defined by 802.11e. DLS is a function of performing direct communication between the STAs under the control of the AP. The details of DLS will be described later.

As described previously, the STA1 has a function of switching to the function of the AP. The controller 201 of the STA1 can also instruct the MAC processor 202 to switch the STA function and AP function.

The MAC processor 202 performs MAC (Medium Access Control) layer processing in accordance with the IEEE802.11 standard.

Also, the MAC processor 202 exchanges a MAC frame with an encoding/decoding processor 203. A data portion such as a video stream is stored in a frame body of the MAC frame. The MAC frame also contains various pieces of information (e.g., calibration information, setting information, address information, authentication information, and sequence control information) in wireless communication channels.

The MAC controller 202 further has a function of measuring the error rate of a received signal by analyzing a MAC frame transmitted from the encoding/decoding processor 203. The MAC processor 202 measures the error rate whenever transferring a predetermined unit of data, and notifies the controller 201 of the measurement result. The controller 201 counts up the counter whenever receiving this notification, thereby detecting the progress of data transfer.

Note that the MAC processor 202 can also analyze a MAC frame defined by 802.11n. In IEEE802.11n, MAC frames having a Legacy mode, Mixed mode, and Greenfield mode are scheduled to be defined. The Legacy mode is a frame having the same structure as that of 802.11a/g. The Mixed mode is a frame compatible with 802.11a/g. The Greenfield mode is a frame that can be communicated between only 802.11n apparatuses. MIMO transmission can be performed when the Mixed mode or Greenfield mode is used, but cannot be performed when the Legacy mode is used.

When instructed to activate DLS by the controller 201, the MAC processor 202 activates DLS in accordance with the instruction, and forms a direct communication channel with a desired STA in the same BSS.

When instructed to switch the AP function and STA function by the controller 201, the MAC processor 202 switches the functions in accordance with the instruction, and executes MAC layer protocol processing as the STA or AP.

Reference numeral 203 denotes the encoding/decoding processor. When transmitting data, the encoding/decoding processor 203 divides a MAC frame transmitted from the MAC processor 202 into streams equal in number to unique paths indicated by $$\sqrt{\lambda_1} \sqrt{\lambda_2} \sqrt{\lambda_{M_0}}$$

and transmits the streams to antenna weight processors 204*a*, 204*b*, and 204*c*. Note that the controller 201 notifies the encoding/decoding processor 203 of the number of unique paths after executing the calibration process.

When receiving data, the encoding/decoding processor 203 reconstructs a MAC frame from streams equal in number to unique paths transmitted from the antenna weight processors 204a, 204b, and 204c, and transmits the MAC frame to the MAC processor 202.

Reference numerals 204a, 204b, and 204c denote the antenna weight processors. The antenna weight processors 204a, 204b, and 204c weight a plurality of streams transmitted from the encoding/decoding processor 203, and transmit the weighted streams to the antennas.

Also, the antenna weight processors 204a, 204b, and 204c generate a plurality of streams by weighting signals received by the individual antennas, and transmit the streams to the encoding/decoding processor 203.

Note that the weighting process described above is a process of changing the time information and amplitude of a transmission signal or received signal. A value based on the eigenvectors $E_t^H$ and $E_r$ calculated by the calibration process is set as the weight.

An operation input unit 205 has a function of detecting an input operation performed by a user, and notifying the controller 201 of the detection result.

The operation input unit 205 of the STA1 (digital video camera) comprises operation buttons. The operation input unit 205 of the STA2 (television monitor) is a light-receiving unit of an infrared remote controller.

A notification unit 206 notifies the user of various pieces of information in accordance with instructions from the controller 201. The notification unit 206 comprises a monitor, loudspeaker, and the like.

In each embodiment to be described below, the execution timing of the calibration process will be explained by taking a plurality of examples. Note that each apparatus can also perform processes in the individual embodiments by combining the processes.

First Embodiment

In this embodiment, the case where the STA1 (or STA2) performs calibration when associating (establishing a logical connection) with the AP will be explained.

Figure 4:
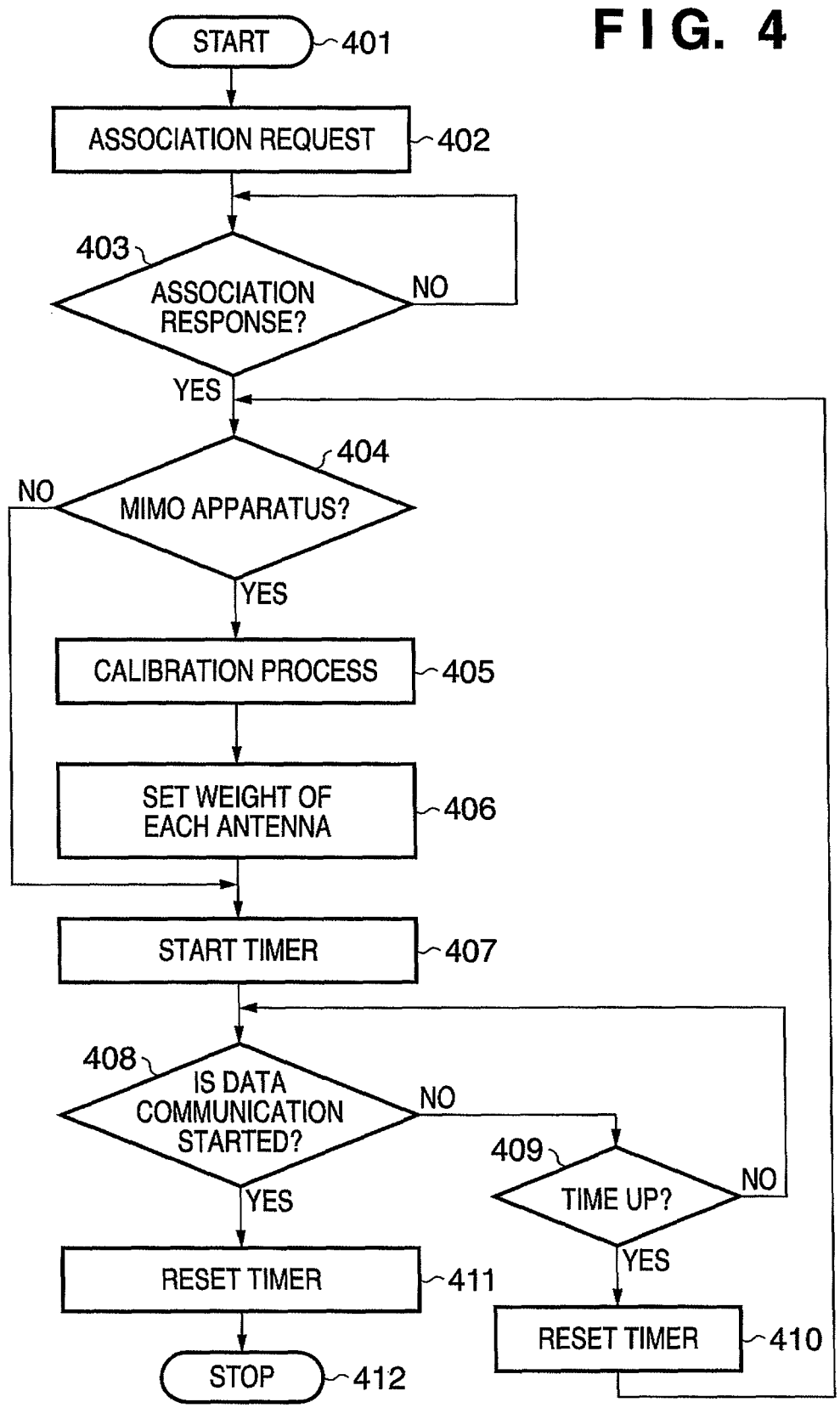
FIG. 4 is a process flowchart according to the first embodiment.

FIG. 4 is a flowchart showing the process sequence of the STA1. Note that the same processing is performed when the STA2 associates with the AP.

First, the STA1 transmits an association request to the AP (step 402). If the STA1 receives an association response signal for accepting association from the AP having received the association request (step 403), the process advances to step 404.

Note that the association request and association response respectively contain the apparatus information of the STA1 and AP, and each apparatus information contains information indicating whether the apparatus supports the MIMO transmission method. In this embodiment and embodiments to be described later, "supporting the MIMO transmission method" is equivalent to "supporting IEEE802.11n".

Then, the STA1 determines whether to start the calibration process. More specifically, the STA1 checks whether the AP supports the MIMO transmission method, on the basis of the apparatus information contained in the association response (step 404). If the AP supports the MIMO transmission method (YES in step 404), the STA1 executes the calibration process with respect to the AP (step 405).

Subsequently, the STA1 sets weights in the antenna weight processors 204a, 204b, and 204c on the basis of the eigenvector $E_t^H$ obtained by the calibration process (step 406). Similarly, the AP also sets weights in the antenna weight processors 204a, 204b, and 204c on the basis of the eigenvector $E_r$ obtained by the calibration process. When this processing is complete, it is possible to start wireless transmission using the MIMO transmission method between the STA1 and AP.

As described above, when the STA associates with the AP, i.e., when the STA participates in the network formed by the AP, it is possible to immediately perform high-speed, large-capacity wireless transmission using the MIMO transmission method.

The description will return to the explanation of FIG. 4.

The controller 201 of the STA1 then activates the timer for measuring the time required before the calibration process is executed again (step 407). If data communication is started (YES in step 408), the controller 201 of the STA1 resets the timer (step 411), and terminates the process sequence.

If the timer has reached a predetermined value while no data communication is started (No in step 408 and YES in step 409), the controller 201 of the STA1 resets the timer (step 410), and the process returns to step 404. Then, the STA1 performs the calibration process with respect to the AP again (step 405).

For example, if the radio wave environment has changed (e.g., the wireless apparatus has moved or the door is opened or closed) after the calibration process is executed once, the calibration process must be executed again. In this processing, the calibration process is executed for every predetermined time when no data communication is performed. When starting data communication, therefore, MIMO transmission can be performed by using appropriate spatial streams.

Note that in step 404 described above, the STA1 determines whether the AP supports the MIMO transmission method, on the basis of the apparatus information contained in the association response. However, this determination may also be performed by another method. For example, the STA1 may also inquire of the AP whether it supports the MIMO transmission method, and perform determination on the basis of the response to the inquiry.

Note also that in the above explanation, the timer is reset when data communication is started. However, the calibration process may also be performed for every predetermined time even after data communication is started. Adequate spatial streams can be maintained by thus periodically executing the calibration process regardless of the presence/absence of data communication.

This embodiment executes the calibration process when the STA associates with the AP. This makes it possible to immediately form appropriate spatial streams, and perform high-speed, large-capacity wireless transmission.

Also, after the calibration process is executed once, the calibration process is performed again for every predetermined period. Accordingly, proper spatial streams can be maintained even if, e.g., the radio wave environment has changed.

Second Embodiment

In this embodiment, the case where video stream transfer started between the STA1 and STA2 via the AP is switched to direct communication (to be referred to as DLS communication hereinafter) performed using the DLS function between the STA1 and STA2 will be explained.

Figure 5:
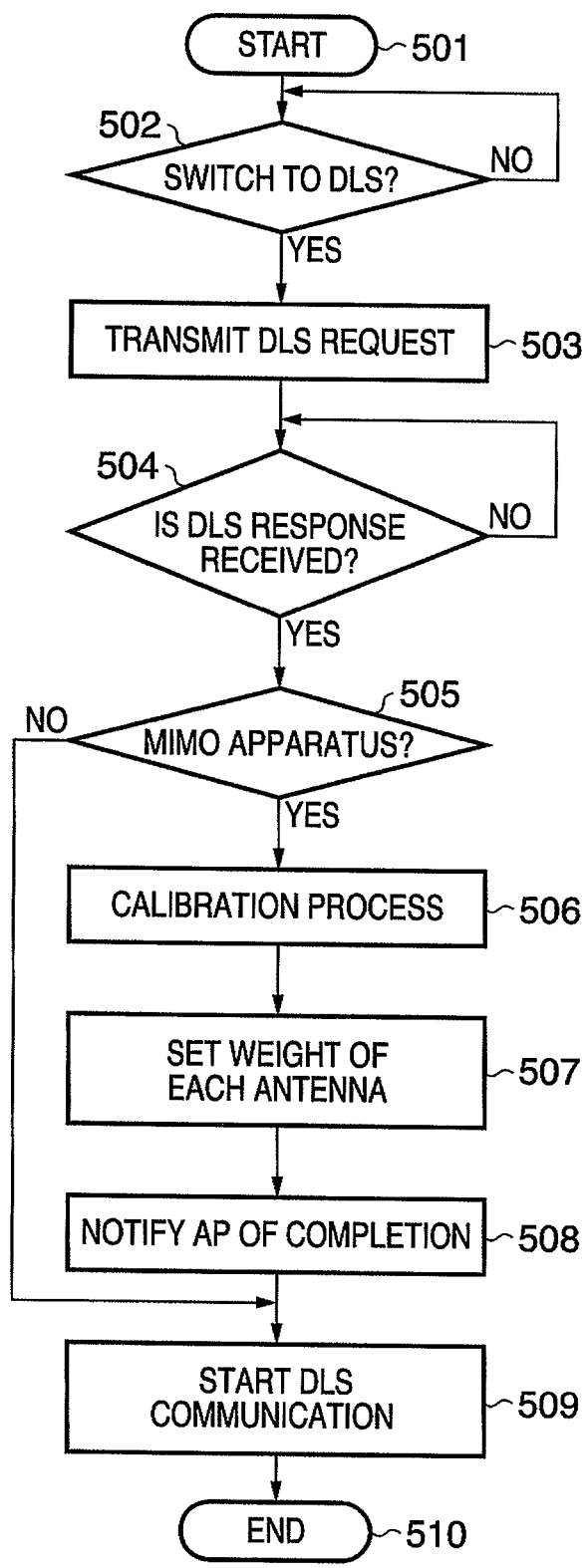
FIG. 5 is a process flowchart according to the second embodiment.

FIG. 5 is a flowchart showing the process sequence of the STA1.

Assume that the STA1 is transmitting a video stream to the STA2 via the AP. If the STA1 determines to switch to DLS communication (YES in step 502), the STA1 transmits a DLS request to the STA2 via the AP (step 503). The STA1 determines to switch to DLS communication when, e.g., the communication quality has deteriorated (the error rate has increased or the transmission rate has decreased) because many STAs (not shown) have started communication under the control of the AP.

The STA2 having received the DLS request returns a DLS response to the STA1 via the AP if the STA2 supports DLS. Note that information elements of the DLS request and DLS response respectively contain the apparatus information of the STA1 and STA2, and each apparatus information contains information indicating whether the STA1 or STA2 supports the MIMO transmission method.

When receiving the DLS response (step 504), the STA1 determines whether to start the calibration process. More specifically, the STA1 checks whether the STA2 supports the MIMO transmission method, on the basis of the apparatus information contained in the DLS response (step 505). If the STA2 supports the MIMO transmission method (YES in step 505), the STA1 executes the calibration process with respect to the STA2 (step 506).

Then, the STA1 sets weights in the antenna weight processors 204a, 204b, and 204c on the basis of the eigenvector $E_t^H$ obtained by the calibration process (step 507). Similarly, the STA2 also sets weights in the antenna weight processors 204a, 204b, and 204c on the basis of the eigenvector $E_r$ obtained by the calibration process. When this processing is complete, it is possible to start direct communication using the MIMO transmission method between the STA1 and STA2.

Subsequently, the STA1 notifies the AP of the completion of the calibration process (step 506) and the completion of the antenna weight setting process (step 507) (step 508). After that, the STA1 starts DLS communication with respect to the STA2 by using the MIMO transmission method under the control of the AP having received the completion notification (step 509).

Note that in the above explanation, the STA1 determines whether the STA2 supports the MIMO transmission method, on the basis of the apparatus information contained in the DLS response. On the other hand, when associating with the STA2, the AP can detect whether the STA2 supports the MIMO transmission method (see the first embodiment). Therefore, the STA1 may also inquire of the AP whether the STA2 supports the MIMO transmission method. In this case, the STA1 may also transmit the DLS request (step 503) if the STA2 supports the MIMO transmission method, and perform no DLS communication if the STA2 does not support the MIMO transmission method. Only when performing DLS communication, the STA1 executes the calibration process, and starts wireless communication using the MIMO transmission method on the basis of the execution result. This processing makes it possible to set DLS communication channels only when high-speed, large-capacity direct communication using DLS is desired.

Note also that in the above explanation, the STA1 determines whether to start executing the calibration process (step 505). However, the STA2 may also perform this determination. In this case, the calibration process need only be started if the STA2 confirms that the STA1 supports the MIMO transmission method, on the basis of the apparatus information contained in the DLS request transmitted from the STA1. The STA2 may also inquire of the AP whether the STA1 supports the MIMO transmission method.

Any method can be adopted to select one of the STA1 and STA2 which is used to determine whether to start the calibration process. For example, an STA to be selected can be predetermined in accordance with whether it is the transmitting side or receiving side of a video stream. In this case, the STAT performs the determination because it is a digital video camera and mainly the data transmitting side, and the STA2 does not perform the determination because it is a television monitor and mainly the data receiving side. Whether to determine the start of the calibration process may also be predetermined on the basis of the type of apparatus.

This embodiment executes the calibration process when switching data transmission started between the STAs via the AP to DLS communication. Accordingly, a high-speed, large-capacity wireless transmission can be performed by using appropriate spatial streams corresponding to the changed wireless transmission channels.

Third Embodiment

In this embodiment, the case where after video stream transmission is started between the STA1 and STA2 via the AP, the STA1 switches to the function of the AP (the STA1 after this switching will be referred to as an AP1 hereinafter) to start direct transfer between the AP1 and STA2 will be explained.

Figure 6:
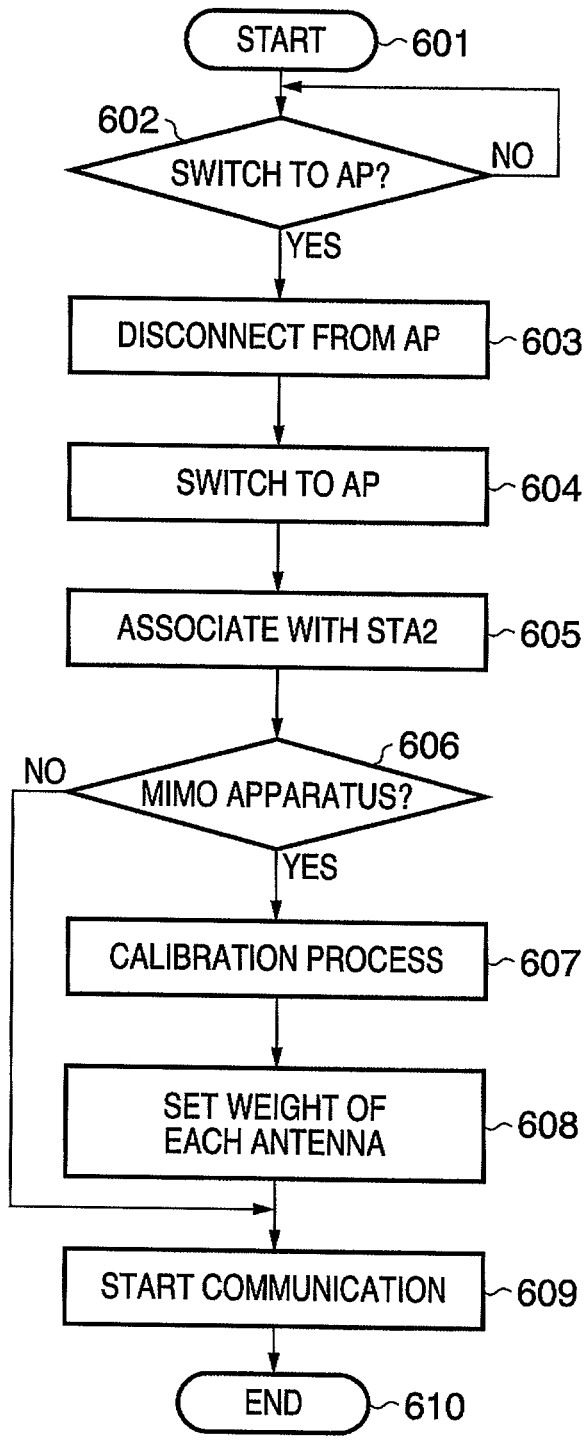
FIG. 6 is a process flowchart according to the third embodiment.

FIG. 6 is a flowchart showing the process sequence of the STA1.

Assume that the STA1 is transmitting a video stream to the STA2 via the AP. If the STA1 determines to switch to the AP1 (YES in step 602), the STA1 performs a process of disconnecting the wireless connection to the AP (step 603). First, the STA1 notifies the STA2 that the STA1 switches to the AP1. Subsequently, the STA1 disconnects the wireless communication channels formed between the STA1 and STA2 via the AP. Finally, the STA1 disconnects the wireless communication channels between the STA1 and AP. Note that the STA1 determines to switch to the AP1 when, e.g., the communication quality has deteriorated because many STAs (not shown) have started communication under the control of the AP, or the user has designated switching.

When the disconnecting process is complete, the STA1 switches the function to the AP1 (step 604), and associates with the STA2 (step 605). More specifically, the AP1 receives an association request transmitted from the STA2, and returns an association response signal for accepting association to the STA2.

Note that the association request and association response respectively contain the apparatus information of the STA2 and AP1, and each apparatus information contains information indicating whether the STA2 or AP1 supports the MIMO transmission method.

Then, the AP1 determines whether to start the calibration process. More specifically, the AP1 checks whether the STA2 supports the MIMO transmission method, on the basis of the apparatus information contained in the association request (step 606). If the STA2 supports the MIMO transmission method (YES in step 606), the AP1 executes the calibration process with respect to the STA2 (step 607).

Then, the AP1 sets weights in the antenna weight processors 204a, 204b, and 204c on the basis of the eigenvector $E_t^H$ obtained by the calibration process (step 608). Similarly, the STA2 also sets weights in the antenna weight processors 204a, 204b, and 204c on the basis of the eigenvector $E_r$ obtained by the calibration process.

When the calibration process (step 607) and the antennal weight setting process (step 608) are complete, the AP1 starts direct communication with the STA2 by using the MIMO transmission method (step 609).

Note that in the above explanation, the AP1 determines whether the STA2 supports the MIMO transmission method, on the basis of the apparatus information contained in the association request. On the other hand, when associating with the STA2, the AP can detect whether the STA2 supports the MIMO transmission method (see the first embodiment). Before switching to the AP1, therefore, the STA1 may also inquire of the AP whether the STA2 supports the MIMO transmission method. In this case, the STA1 can switch to the AP1 and execute the calibration process if the STA2 supports the MIMO transmission method, and need not switch to the AP1 if the STA2 does not support the MIMO transmission method. This processing allows the STA1 to switch to the AP1 only when high-speed, large-capacity direct communication is desired between the STA1 and STA2.

Note also that in the above explanation, the AP1 determines whether to start executing the calibration process (step 606). However, the STA2 may also perform this determination. In this case, the calibration process need only be started if the STA2 confirms that the AP1 supports the MIMO transmission method, on the basis of the apparatus information contained in the association response transmitted from the AP1. When notifying the STA2 of switching to the AP1, the STA1 may also notify the STA2 whether the STA1 supports the MIMO transmission method. In this case, the STA2 can determine whether to start executing the calibration process, on the basis of the notified information.

Any method can be adopted to select one of the AP1 and STA2 which is used to determine whether to start the calibration process. For example, an apparatus to be selected can be predetermined in accordance with whether it is the transmitting side or receiving side of a video stream. In this case, the AP1 performs the determination because it is a digital video camera and mainly the data transmitting side, and the STA2 does not perform the determination because it is a television monitor and mainly the data receiving side. Whether to determine the start of the calibration process may also be predetermined on the basis of the type of apparatus.

This embodiment executes the calibration process when one of the STAs having started data transmission via the AP switches to the function of the AP. Even when the wireless communication channels are changed, therefore, it is possible to perform high-speed, large-capacity wireless transmission by forming appropriate spatial streams.

Fourth Embodiment

In this embodiment, the case where the calibration process is executed after video stream transmission is started between the AP1 (i.e., the STA1 having switched to the AP function) and the STA2 will be explained.

Figure 7:
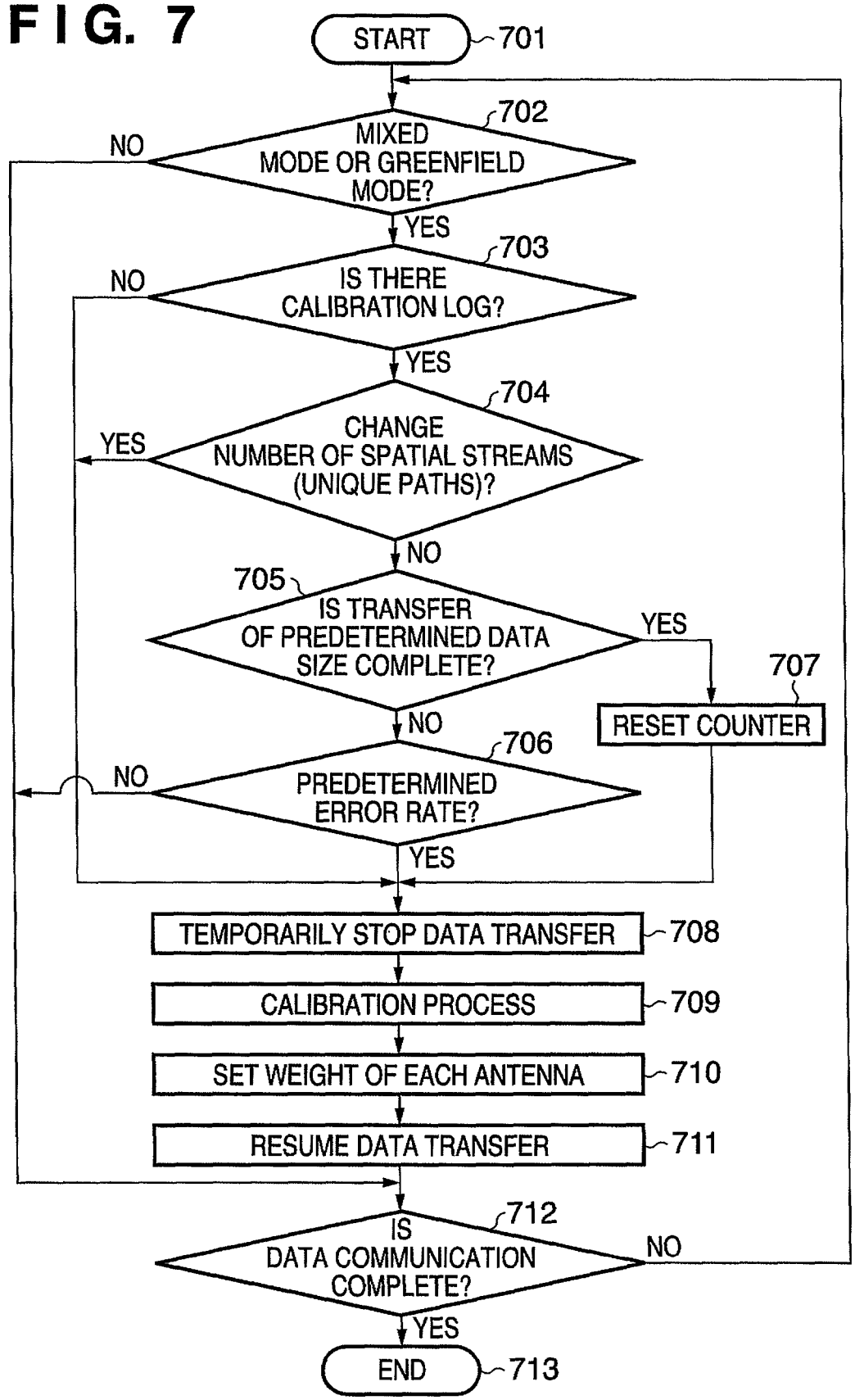
FIG. 7 is a process flowchart according to the fourth embodiment.

FIG. 7 is a flowchart showing the process sequence of the STA2.

Assume that the STA1 has switched to the AP1 and the AP1 is directly transmitting a video stream to the STA2.

First, the MAC processor 202 of the STA2 analyzes a received MAC frame. As described previously, MIMO transmission can be performed when the Mixed mode or Greenfield mode is used, but cannot be performed when the Legacy mode is used. If the result of the analysis of the received MAC frame indicates that the MAC frame is the Mixed mode or Greenfield mode of IEEE802.11n (YES in step 702), the process advances to step 703.

In step 703, the controller 201 of the STA2 searches the calibration process log, and checks whether the calibration process has been executed for the AP1 as the transmission source apparatus of the MAC frame. If no calibration process has been executed (NO in step 703), the STA2 determines that the calibration process is necessary, and the process advances to step 708. If the calibration process has been executed (YES in step 703), the process advances to step 704.

In step 704, the STA2 determines whether to change the number of spatial streams (the number of unique paths) used as the wireless communication channels. For example, the number of spatial streams is increased if it is necessary to increase the transmission capacity in order to increase the resolution of the video stream, and decreased if it is necessary to reduce the transmission capacity in order to effectively use the wireless band in the system. Whether to change the number of spatial streams can be determined by the STA2 itself or in accordance with an instruction from the AP1.

If the number of spatial streams is to be changed (YES in step 704), the STA2 determines that the calibration process is necessary, and the process advances to step 708. If the number of spatial streams is not to be changed (NO in step 704), the process advances to step 705.

In step 705, the STA2 determines whether the transmission of data having a predetermined size is complete. As described earlier, the MAC processor 202 measures the error rate whenever transferring a predetermined unit of data, and notifies the controller 201 of the measurement result. The controller 201 counts up the counter whenever receiving the notification. Accordingly, the STA2 can detect the progress of data transfer.

If the transmission of data having a predetermined size is complete, i.e., if the counter has reached a predetermined value (YES in step 705), the STA2 determines that the calibration process is necessary, and resets the counter (step 707). After that, the process advances to step 708.

If the transfer of data having a predetermined size is not complete (NO in step 705), the STA2 determines whether an error rate equal to or higher than a predetermined value is detected (step 706). The controller 201 of the STA2 compares the error rate notified by the MAC processor 202 with a preset error rate. If the error rate notified by the MAC processor 202 is higher (YES in step 706), the STA2 determines that the calibration process is necessary, and the process advances to step 708. If the notified error rate is lower (NO in step 706), the process advances to step 712.

In step 708, data transfer currently being performed between the AP1 and STA2 is temporarily interrupted because it is determined in one of steps 703, 704, 705, and 706 that the calibration process is necessary.

Then, the STA2 executes the calibration process with respect to the AP1 (step 709). Subsequently, the STA2 sets weights in the antenna weight processors 204a, 204b, and 204c on the basis of the eigenvector $E_t^H$ obtained by the calibration process (step 710). Similarly, the AP1 also sets weights in the antenna weight processors 204a, 204b, and 204c on the basis of the eigenvector $E_r$ obtained by the calibration process.

When the calibration process (step 709) and antenna weight setting process (step 710) are complete, temporarily stopped data transfer between the AP1 and STA2 is resumed (step 711). After data transfer is resumed, wireless communication can be performed by using spatial streams based on the latest calibration process result.

If data communication is complete (YES in step 712), the process sequence is terminated. If data communication is not complete (NO in step 712), the process returns to step 702, and the STA2 performs determination again in each of steps 703 to 706.

Note that the AP1 and STA2 directly transfer data in the above explanation, but the same processing can be performed even when the STA1 and STA2 transfer data via the AP. In this case, the AP performs the above-mentioned processing of the STA2 between the STA1 and AP, and the STA2 performs the above-mentioned processing of the STA2 between the AP and STA2.

In this embodiment, whether the partner apparatus supports the MIMO transmission method is checked by analyzing the received MAC frame, and whether to start the calibration process is determined by checking whether the calibration process has already been performed for the partner apparatus. Accordingly, the calibration process can be performed at a proper timing without performing any unnecessary calibration process.

Also, the calibration process is executed when changing the number of spatial streams during data transfer. This makes it possible to reform appropriate spatial streams corresponding to the transmission capacity.

In addition, the calibration process is executed when the transfer of data having a predetermined size is complete. Therefore, adequate spatial streams can be maintained even if the radio wave environment has changed during the processing.

Furthermore, the calibration process is executed when the error rate has reached a predetermined value. Even if the communication quality has deteriorated due to, e.g., the change in radio wave environment, therefore, proper spatial streams can be automatically reformed.

Fifth Embodiment

Figure 8:
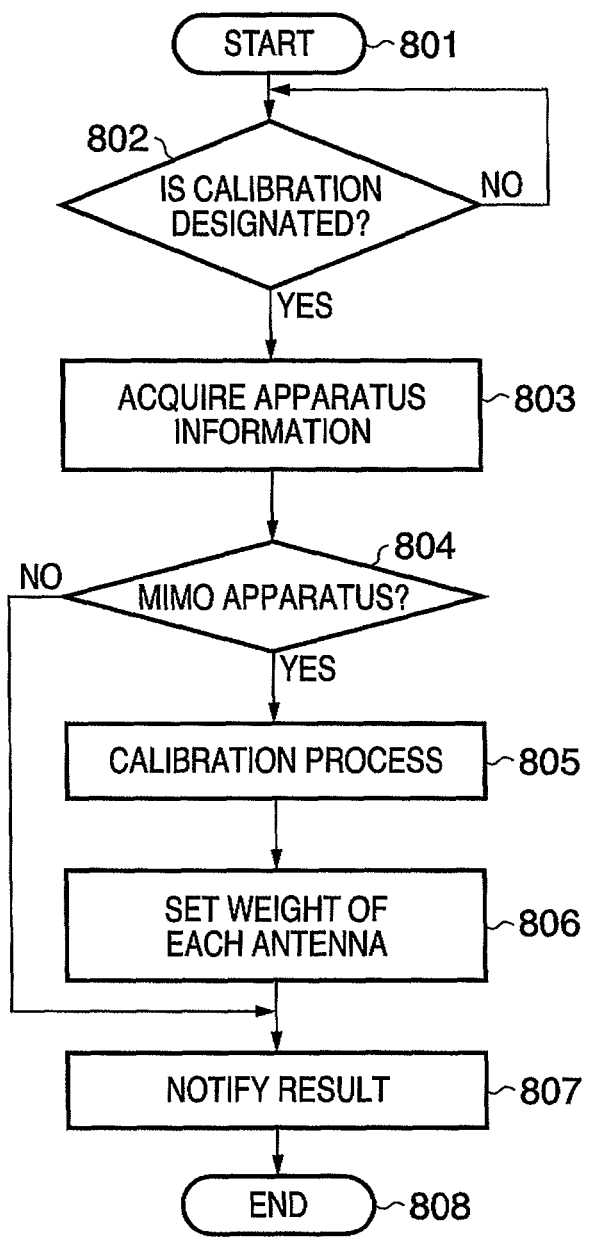
FIG. 8 is a process flowchart according to the fifth embodiment.

FIG. 8 is a flowchart showing the process sequence when executing calibration by a user's operation. In this embodiment, the calibration process is executed between desired apparatuses by a user's operation. Accordingly, this processing is applicable to any of the STA1, STA2, and AP. The processing will be explained below by taking the STA1 as an example.

The controller 201 of the STA1 detects that an operation for executing calibration is performed on the operation input unit 205 (step 802). Note that the partner apparatus as an object of calibration is also designated in the operation.

If the operation performed by the user is detected (YES in step 802), the STA1 acquires the apparatus information of the partner apparatus as an object of the calibration process, in order to determine whether to actually execute the calibration process (whether it is necessary to execute the calibration process) (step 803).

More specifically, the controller 201 of the STA1 searches the calibration process log, and checks whether the calibration process has already been executed for the partner apparatus. If no information of the partner apparatus exists in the calibration process log, the STA1 exchanges control signals with the partner apparatus, and acquires the apparatus information of the partner apparatus.

If the acquired apparatus information indicates that the partner apparatus supports the MIMO transmission method (YES in step 804), the STA1 executes the calibration process with respect to the partner apparatus (step 805).

Subsequently, the STA1 sets weights in the antenna weight processors 204a, 204b, and 204c on the basis of the eigenvector $E_t^H$ obtained by the calibration process (step 806). Similarly, the partner apparatus also sets weights in the antenna weight processors 204a, 204b, and 204c on the basis of the eigenvector $E_r$ obtained by the calibration process. When this processing is complete, the STA1 and partner apparatus can perform wireless communication by using spatial streams based on the latest calibration process result.

When the calibration process (step 805) and antenna weight setting process (step 806) are complete, the notification unit 206 of the STA1 notifies the user of the processing results (step 807).

More specifically, the notification unit 206 performs, e.g., a process of displaying a message indicating the completion of the calibration process on the monitor, or a process of outputting a voice guidance or sound effect from the loudspeaker.

If the calibration process cannot be executed because the partner apparatus does not support the MIMO transmission method (NO in step 804), the notification unit 206 notifies the user of this information (step 807).

This embodiment can execute the calibration process at a given timing in accordance with an instruction from the user. Accordingly, if the form of use of an apparatus in the system, the environment, or the like has changed, appropriate spatial streams can be reformed at a timing desired by the user.

Note that each of the above embodiments has been explained by taking the case where the 802.11n wireless LAN is used as an example. However, the present invention is also applicable to another wireless communication using the MIMO transmission method.

It is of course also possible to achieve the object of the present invention by supplying, to a system or apparatus, a recording medium recording the program code of software that implements the functions of the above-mentioned embodiments, and read out and execute the program code stored in the recording medium by a computer (or a CPU or MPU) of the system or apparatus.

In this case, the program code itself read out from the recording medium implements the functions of the above embodiments, and the recording medium storing the program code constitutes the present invention.

As this recording medium for supplying the program code, it is possible to use, e.g., a floppy (registered trademark) disk, hard disk, optical disk, magnetooptical disk, CD-ROM, CD-R, magnetic tape, nonvolatile memory card, or ROM.

Also, besides the functions of the above embodiments are implemented by executing the readout program code by the computer, the present invention naturally includes the case where an OS (Operating System) or the like running on the computer performs part or the whole of actual processing on the basis of instructions by the program code, thereby implementing the functions of the embodiments.

Furthermore, the present invention of course also includes the case where the program code read out from the recording medium is written in a memory of a function expansion board inserted into the computer or of a function expansion unit connected to the computer, and a CPU or the like of the function expansion board or function expansion unit performs part or the whole of actual processing on the basis of instructions by the program code, thereby implementing the functions of the above embodiments.

As has been described above, when performing wireless transmission using the MIMO transmission method, each of the above embodiments can perform the calibration process at a proper timing corresponding to, e.g., information of the partner wireless apparatus, the use status of each wireless apparatus, or the change in radio wave environment.

This application claims the benefit of Japanese Patent Application No. 2007-057241, filed Mar. 7, 2007 which is hereby incorporated by reference herein in its entirety.

What is claimed is:

1. A wireless communication method in which a first wireless communication apparatus performs data communication with a second wireless communication apparatus by using a plurality of transmission channels formed by spatial multiplexing, the method comprising the steps of:
- determining an error rate of a communication between the first wireless communication apparatus and the second wireless communication apparatus;
- executing a calibration process of forming the plurality of transmission channels between the first wireless communication apparatus and the second wireless communication apparatus if it is determined that the determined error rate is higher than a predetermined error rate, and not executing the calibration process of forming the plurality of transmission channels between the first wireless communication apparatus and the second wireless communication apparatus if it is determined that the determined error rate is lower than the predetermined error rate,
- wherein the calibration process comprises determining an eigenvector for the first wireless communication apparatus based on transmission channels information, and
- calculating weights based on the determined eigenvector for weighting signals that are transmitted from the first wireless communication apparatus.

2. A first wireless communication apparatus which performs data communication with a second wireless communication apparatus by using a plurality of transmission channels formed by spatial multiplexing, the first wireless communication apparatus comprising:
- a determination unit constructed to determine an error rate of a communication between the first wireless communication apparatus and the second wireless communication apparatus; and
- a calibration unit constructed to execute a calibration process of forming the plurality of transmission channels with the second wireless communication apparatus if it is determined by the determination unit that the determined error rate is higher than a predetermined error rate, and not execute the calibration process of forming the plurality of transmission channels between the first wireless communication apparatus and the second wireless communication apparatus if it is determined by the determination unit that the determined error rate is lower than the predetermined error rate,
- wherein the calibration process comprises determining an eigenvector for the first wireless communication apparatus based on transmission channels information, and
- a calculation unit constructed to calculate weights based on the determined eigenvector for weighting signals that are transmitted from the first wireless communication apparatus.

3. A non-transitory computer-readable storage medium storing computer executable process steps, the computer executable process steps causing a computer to execute the method of claim 1.

4. The method according to claim 1, wherein the first wireless communication apparatus and the second wireless communication apparatus communicate using a plurality of antennas respectively.

5. The method according to claim 1, wherein one of the first wireless communication apparatus and the second wireless communication apparatus is an access point.

6. The method according to claim 1, wherein the calibration process comprises determining eigenvectors for the first wireless communication apparatus and the second wireless communication apparatus.

7. The method according to claim 1, wherein the error rate is measured each time a data in a predetermined size is transmitted.

8. The method according to claim 1, further comprising:
- if it is determined that the determined error rate is higher than a predetermined error rate, interrupting communication currently being performed between the first wireless communication apparatus and the second wireless communication apparatus; and
- resuming the interrupted communication after executing the calibration process.

9. The apparatus according to claim 2, wherein the first wireless communication apparatus and the second wireless communication apparatus communicate using a plurality of antennas respectively.

10. The apparatus according to claim 2, wherein one of the first wireless communication apparatus and the second wireless communication apparatus is an access point.

11. The apparatus according to claim 2, wherein the calibration process comprises determining eigenvectors for the first wireless communication apparatus and the second wireless communication apparatus.

12. The apparatus according to claim 2, wherein the error rate is measured each time a data in a predetermined size is transmitted.

13. The apparatus according to claim 2, wherein:
- if it is determined that the determined error rate is higher than a predetermined error rate, communication currently being performed is interrupted between the first wireless communication apparatus and the second wireless communication apparatus, and
- the interrupted communication resumes after execution of the calibration process.

\* \* \* \* \*